Feb. 14, 1967  A. K. CHITAYAT  3,303,739
MEANS FOR TRANSMITTING PLURAL IMAGES THROUGH
A FIBER OPTIC CABLE
Filed July 17, 1963  3 Sheets-Sheet 1
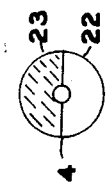
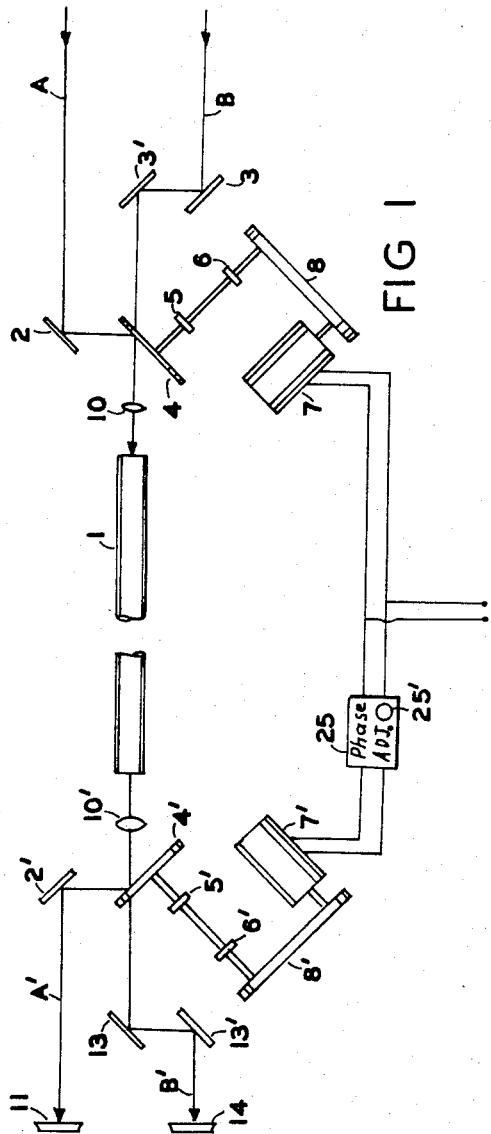
INVENTOR.
ANWAR K. CHITAYAT
BY James P. Malone Feb. 14, 1967  A. K. CHITAYAT  3,303,739
MEANS FOR TRANSMITTING PLURAL IMAGES THROUGH
A FIBER OPTIC CABLE
Filed July 17, 1963  3 Sheets-Sheet 2

INVENTOR.
ANWAR K. CHITAYAT
BY *James P. Malone*

United States Patent Office 3,303,739
Patented Feb. 14, 1967

3,303,739
MEANS FOR TRANSMITTING PLURAL IMAGES
THROUGH A FIBER OPTIC CABLE
Anwar K. Chitayat, Plainview, N.Y., assignor to
Optomechanisms, Inc., Plainview, N.Y.
Filed July 17, 1963, Ser. No. 295,679
2 Claims. (Cl. 88—1)

This invention relates to means for transmitting images through a fiber optic cable.

Fiber optic cables have various uses, for instance to transmit images to a remote point. They are especially useful in photo interpretations, periscopes, and for viewing objects where human beings are not allowed. In many of these applications, it is desirable to transmit stereoscopic images or images of two or more devices or indicators.

Other uses and embodiments are shown in my co-pending applications: Image Enhancement Means, Serial No. 148,258, filed October 27, 1961, now Patent No. 3,217,588, granted November 16, 1965, Image Enhancement Means, Serial No. 194,940, filed May 15, 1962, now Patent No. 3,217,589, granted November 16, 1965 and Image Enhancement Means, Serial No. 266,730, filed March 20, 1963.

The present invention generally provides means for receiving a plurality of images, alternately transmitting the images at a rate sufficiently high so that there is no flicker perceptible to the eye.

The invention generally comprises a plurality of optical input means in one end of the cable and means between the input means of the cable to alternately transmit said image to the input end of said cable. This means may be a rotating half mirror or other image chopping devices. At the output end of said cable is mounted similar means for transmitting separate images to different optical means. If a stereoscopic image is transmitted onto a screen, it is desirable to polarize the separate outputs.

Accordingly, a principal object of the invention is to provide new and improved means for transmitting a plurality of images through a fiber optic cable.

Another object of the invention is to provide new and improved means for transmitting stereoscopic images through fiber optic cables.

Another object of the invention is to provide new and improved means to transmit a pair of images through a fiber optic cable comprising, a pair of optical input means at one side of said cable, means between said input means and said cable to alternately transmit said images onto the end of said cable, similar separate optical output means at the other end of said cable and means between said output means and the end of said cable to alternately transmit said images from said cable to said separate output means.

Another object of the invention is to provide new and improved means for transmitting stereoscopic images through a fiber optic cable including means to polarize the separate output images.

These and other objects of the invention will be apparent from the following specification and drawings of which:

FIGURE 1 is a schematic view of an embodiment of the invention.

FIGURE 4 shows a detail view of a rotatable disc.

Figure 2:
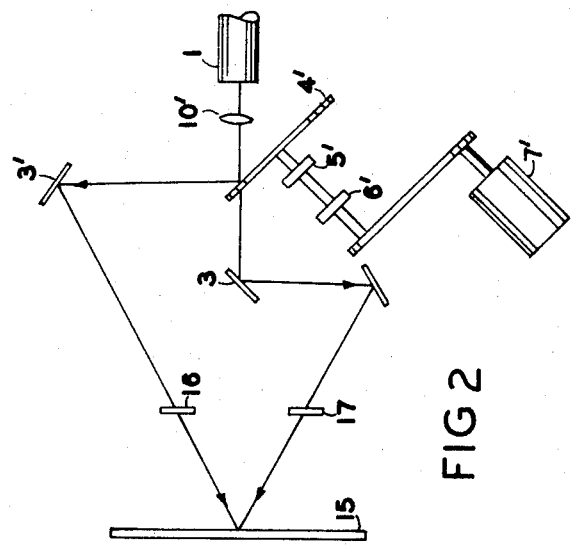
FIGURES 2 and 5 are schematic views of embodiments of the invention having polarizing means for stereoscopic views.

Referring to FIGURE 1, there is shown a fiber optic cable 1, a pair of input optical means comprising, the mirrors 2 and 3 and means for alternately transmitting the separate images onto the end of the fiber optic cable comprise a rotatable disc 4, which is half transparent and half mirror as in FIG. 4. The disc 4 is mounted in a pair of bearing brackets 5 and 6 and is adapted to be rotated by the means of motor 7 via the belt 8. A lens 10 focuses the images onto the end of the fiber cable.

Since the disc 4 is half transparent and half mirror, during one half of the cycle an image A will be transmitted via mirror 2 and via the mirror half of the disc 4 through lens 10. The other image will alternately be transmitted via the mirrors 3 and 3' through the transparent portion of the disc 4 into the lens 10.

At the output end of the cable 1 is a similar optical arrangement comprising, the disc 4' which is rotatably mounted on bearing brackets 5' and 6' and which is adapted to be rotated by means of the motor 7' via the belt 8'. The disc 4' is also half transparent and half mirror and the lens 10' focuses the image at the end of the cable onto the disc 4'. The mirror portion of the disc 4' transmits image A' onto the mirror 2' and then to output eyepiece 11. The transparent portion of the disc 4' permits the image B' to be transmitted through via the mirrors 13 and 13' to the output eyepiece 14. The motors 7 and 7' have to be phased synchronized so that the images will be properly duplexed, that is alternately transmitted. The motors may be phase synchronous motors that run off the same line or one of the motors may be servo controlled in the conventional manner, or one motor may be used and a flexible shaft arrangement may be used to rotate the disc at the opposite end of the cable. Various motor arrangements are shown in my prior aforementioned applications. Phase adjusting means 25 having adjustment knob 25' may be incorporated.

The rate of rotation of the discs is chosen sufficiently high so that there will be no perceptible flicker to the human eye. If it is desired to project a stereoscopic image onto a screen 15, FIGURE 2, then it is desirable to separate the images with polarizing devices 16 and 17 which would be located at the position of the output eyepieces 11 and 14, in FIGURE 1. The viewer would then wear polarized glasses 19 and 19' in order to separate the two stereoscopic images.

More than two images may be alternately transmitted to the cable by arranging the disc with the proper number of segments and arranging the input mirrors properly or additional discs may be used to provide more images.

Figure 3:
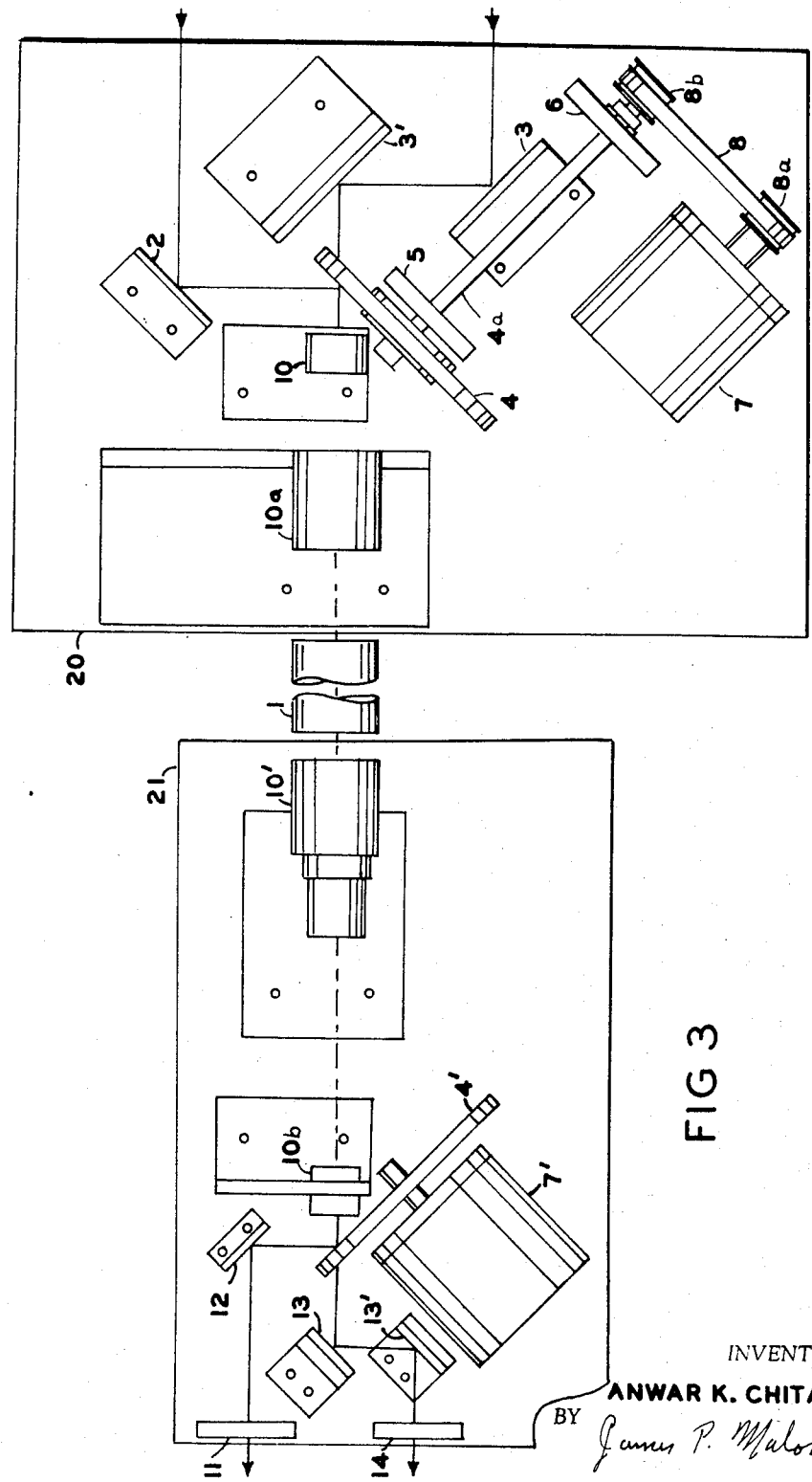
FIGURE 3 is a plan view of an embodiment of the invention.

FIGURE 3 shows a plan view of the embodiment of FIGURE 1 comprising the cable 1 and base members 20 and 21 upon which are mounted in the optical elements. At the input side of the cable on the base member 20 are mounted the mirrors 3, 3', and 2 and lenses 10 and 10a. The disc 4 is rotatably mounted on the shaft 4a, which is mounted in the bearing brackets 5 and 6. The disc is adapted to be rotated by means of the motor 7 via the belt 8, which is mounted on pulleys 8a and 8b.

The output optical elements are mounted on the base 21 and comprise the lenses 10 and 10b, and the disc 4' which is rotatably mounted to driven means by the motor 7', in similar manner as discussed in FIGURE 1. Mirrors 12, 13, and 13' are similar to the input mirrors. The eyepieces 11 and 14 are the same as discussed in FIGURE 1 and are preferably adjustable for the proper eye spacing. Suitable means, not shown, are provided for mounting the cable on the base members 20 and 21.

FIGURE 4 shows a detail view of a rotatable disc 4 which has a transparent section 22 and a mirror section 23.

Figure 5:
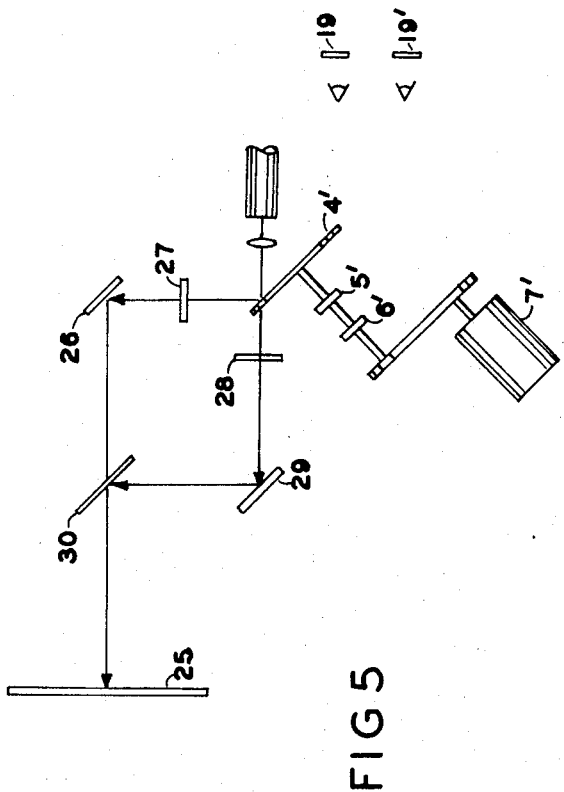

FIGURE 5 shows another embodiment of the invention for projecting stereoscopic images onto a screen 25. In this embodiment the image is received from the end of the cable 1 and passes to the rotating disc 4' which reflects the image to the mirror 26 through the polarizing filter 27. The second image passes through the disc 4' through a polarizing filter 28 to a mirror 29. The two images then combine on the semi-silvered mirror 30 and passes onto the screen 25, thereby providing a stereoscopic view on the screen 25.

In the present invention, both of the images use all of the fibers so there is no loss of resolution.

Therefore, the present invention provides means for transmitting a pair of plurality of images simultaneously and alternately through a fiber optic cable for the purpose of providing stereoscopic images or for providing simultaneously one or more images such as indicated.

Many modifications may be made by those who desire to practice the invention without departing from the scope therein which is defined by the following claims.

I claim:
1. Means for transmitting a pair of images comprising,
    an image conducting fiber optic cable having first and second faces,
    a pair of optical input means at one end of said cable, defining a pair of optical paths, one for each of said images,
    a first rotatable half mirror disc, having one section fully reflective and the other fully transparent, located between said input means and said first face of said cable to alternately transmit said images onto said first face of said cable,
    a pair of optical output means located adjacent said second face of said cable, defining a pair of optical paths, one for each of said images, a second rotatable half mirror disc, having one section fully reflective and the other fully transparent, located between said output means and said second face of said cable to alternately transmit said images from said cable to said output means, and means to rotate said first and second half mirror discs in phase synchronism.

2. Apparatus as in claim 1 having a screen adapted to receive said images and polarizing means located between said output means and said screen to provide a stereoscopic view.

References Cited by the Examiner

UNITED STATES PATENTS

| | | | |
|---|---|---|---|
| 2,669,902 | 2/1954 | Barnes | 88—34 X |
| 2,983,835 | 5/1961 | Frey. | |
| 3,143,589 | 8/1964 | Brault et al. | 88—1 X |
| 3,216,778 | 11/1965 | Davies et al. | |

FOREIGN PATENTS

| | | |
|---|---|---|
| 506,134 | 10/1951 | Belgium. |
| Ad. 79,388 | 10/1962 | France. |
| 310,527 | 10/1930 | Great Britain. |

JEWELL H. PEDERSEN, *Primary Examiner.*

JOHN K. CORBIN, *Examiner.*